United States Patent [19]
Mori et al.

[11] Patent Number: 5,659,166
[45] Date of Patent: Aug. 19, 1997

[54] CARD PROCESSOR WITH INTERLOCKED PROCESSING FUNCTION

[75] Inventors: Seiji Mori; Asako Haseba, both of Kawasaki, Japan

[73] Assignee: Fujitsu Limited, Kawasaki, Japan

[21] Appl. No.: 403,739

[22] PCT Filed: Jul. 15, 1994

[86] PCT No.: PCT/JP94/01167

§ 371 Date: May 22, 1995

§ 102(e) Date: May 22, 1995

[87] PCT Pub. No.: WO95/02871

PCT Pub. Date: Jan. 26, 1995

[30] Foreign Application Priority Data

Jul. 16, 1993 [JP] Japan .................................. 5-176918

[51] Int. Cl.⁶ ...................................................... G06K 5/00
[52] U.S. Cl. ...................................................... 235/380
[58] Field of Search .................................. 235/380, 375, 235/492; 902/22, 40; 340/825.31, 825.34

[56] References Cited

FOREIGN PATENT DOCUMENTS

| | | |
|---|---|---|
| 0253240 | 1/1988 | European Pat. Off. . |
| 2715748 | 8/1995 | France . |
| 49-5233 | 1/1974 | Japan . |
| 63-316196 | 12/1988 | Japan . |
| 0076097 | 3/1990 | Japan .................... 235/360 |
| 287294 | 3/1990 | Japan . |
| 02113396 | 4/1990 | Japan . |
| 0264395 | 10/1990 | Japan .................... 235/380 |
| 2249099 | 10/1990 | Japan . |
| 03002996 | 1/1991 | Japan . |
| 3271995 | 12/1991 | Japan . |
| 470992 | 3/1992 | Japan . |
| 470993 | 3/1992 | Japan . |
| 04070993 | 3/1992 | Japan . |
| 4086990 | 3/1992 | Japan .................... 235/380 |
| 4205596 | 7/1992 | Japan . |
| 04242890 | 8/1992 | Japan . |
| 4242890 | 8/1992 | Japan . |
| 5174249 | 7/1993 | Japan . |
| 05225221 | 9/1993 | Japan . |
| 5225221 | 9/1993 | Japan . |
| 5233957 | 9/1993 | Japan .................... 235/380 |
| 6096293 | 4/1994 | Japan .................... 235/380 |
| 6103422 | 4/1994 | Japan .................... 235/380 |

*Primary Examiner*—Donald T. Hajec
*Assistant Examiner*—Thien Minh Le
*Attorney, Agent, or Firm*—Greer, Burns & Crain, Ltd

[57] ABSTRACT

To provide a card processor capable of easily and quickly executing business processing by establishing an automated system that continuously executes related functions and copes with a plurality of functions in order to improve service and business efficiency by the use of the card processor which has a plurality of functions. The card processor has a pre-paid processing function and a point processing function, and includes an identification element for identifying the function possessed by a card depending upon the kind of the card, a judging element for judging a function that can be processed in an interlocked manner depending upon the result of identification by the identification, and an operation element for executing the arithmetic operation processing based upon the result of the judgement by the identification element and/or the judging element. The point processing is executed following the pre-paid processing in an interlocked manner.

16 Claims, 11 Drawing Sheets

Fig.5

| ITEMS | DATA |
|---|---|
| COMPANY CODE | 999980000000 |
| GROUP NUMBER | 01 |
| PRINTED DATA SPECIFIC TO COMPANY | XXXXXXXXXX |
| INTERLOCKED ISSUANCE RATE | 0100 |
| INTERLOCKED RECOVERY RATE | 0050 |
| INTERLOCKING YES/NO FLAG | 01 |

Fig.6

| ITEMS | DATA |
|---|---|
| IDENTIFIER | 01 |
| PRINTED DATA SPECIFIC TO COMPANY | XX |
| GROUP NUMBER | 01 |
| COMPANY CODE | 1694222 |
| PAYMENT METHOD SELECTION DATA | 03010101 |
| FLAG | 87 |
| MANUAL INPUT YES/NO | 00 |
| PERSONAL IDENTIFICATION CHECK FLAG | 0000 |
| OFF-LINE LIMIT | 0050 |
| PRINTABLE RANGE OF MEMBER NUMBER | 01190116 |
| LOCAL PRINTING | 07 |
| INTERLOCKING YES/NO FLAG | 01 |
| POINT ISSUANCE RATE | 05 |

Fig. 7

| START CODE | MEMBER NUMBER | SEPARATOR | VALID TERM | SEPARATOR | PERSONAL ID | INTERLOCKING YES/NO FLAG | FREEDOM | END CODE | CHECK CODE |

CARD PROCESSOR WITH INTERLOCKED PROCESSING FUNCTION

TECHNICAL FIELD

The present invention relates to a card processor which is capable of executing the exact-calculation processing for credit cards, pre-paid cards and cash cards and of offering point service (a service wherein when goods are sold, service coupons corresponding to the paid total are given, and after the total of the points reaches a predetermined amount, the amount is returned to the customer), the card processor being further capable of continuously processing related functions among these plurality of functions and updating data in the host unit.

In recent years, a variety of services have been offered using cards as represented by widespread use of various cards such as pre-paid cards, credit cards, cash cards and the like, and the applications are still expanding depending upon their functions.

The cards used in card processors include a card that is capable of executing a plurality of functions such as exact-calculation processing and point processing, a plurality of cards for executing a plurality of functions, a card capable of executing only exact-calculation processing, and the like.

The card processors for such a variety of applications are being used in quite different fields as part of means for improving services for the card users and for promoting the use of credit cards and pre-paid cards. Moreover, a variety of attempts have been made to incorporate various other additional service functions.

In the card processor having such a plurality of functions, however, the data corresponding to the individual functions must be stored in the card, resulting in an increase in the amount of data and causing the operating procedure to become complex. To save the amount of work and for better efficiency, therefore, a system to automatically provide a variety of functions has been demanded.

BACKGROUND ART

In a conventional card processor having a plurality of functions, the operation for utilizing a given function is separate from the operation for other functions; i.e., the operation is cumbersome and inefficient, and the special functions are often not exhibited to a sufficient degree.

In conventional card processors, for instance, pre-paid transactions and point-service are processed independently from each other. When it is desired to issue points depending upon the sum paid through the pre-paid processing, a point card for point processing is inserted after the pre-paid processing is finished and the pre-paid card is discharged, the sum to be paid is input again to execute the point processing, and points are issued.

Even in a band POS (Point-of-Sales) in which the sum of goods purchased by a customer is drawn out from the bank account of the customer, the processing drawn out from the bank account is finished in order to execute a point issue, the point service is designated using a keyboard, the point card is read out again, and the sum of the purchase is input again through the keyboard.

In the conventional card processor as described above, even when the card has a plurality of functions such as a bank POS function and the accompanying service point processing, the operations must be carried out independently of each other. That is, when a given function is finished, the card is discharged. The card must then be inserted again to execute the next function processing; i.e., the card must be read out again and the sum of purchase must be input again.

Therefore, the card is read out and the sum is input, requiring cumbersome operation, causing the business to become inefficient and requiring the customers to wait for extended periods of time, which is not desirable from the standpoint of service to the customers. Therefore, improvement has been urged from the standpoint of efficiently carrying out business and improving service.

When the number of points stored in the card or the accumulated number of points managed by a host computer in the shopping center has reached a predetermined value, the card is recovered by the card processor, and the sum or goods corresponding to the recovered value is given to the customer as a bonus present.

According to a conventional method in which a full-point receipt (exchange ticket for money issued when the accumulated number of points has reached a predetermined value) is printed and issued, and the sum corresponding to the number of points is returned back to the customer, however, the customer uses the receipt quite like a merchandise coupon, involving confusion in case the receipt is lost and further making it necessary for a shop to report to the headquarter the recovery of points by sticking a full-point receipt that is recovered, resulting in an increase in the amount of cumbersome work that must be executed. Improvement, therefore, has also been demanded with respect to this point.

Japanese Unexamined Patent Publication (Kokai) No. 62-111354 disclosed a method according to which a shop issues in advance a card recording a predetermined number of stamp points to a customer, and subtracts a number of stamp points corresponding to the sum of purchase from the card each time the customer makes a purchase.

There has further been proposed a method in which a point card is delivered to the customer first, and points are added depending upon the customer's sum of purchase. When the accumulated points have reached a predetermined number of points, however, the point card is converted into a pre-paid card so that it is used as a pre-paid card (Japanese Unexamined Patent Publication No. 4-242890).

Moreover, Japanese Unexamined Patent Publication No. 4-70993 proposed a system in which pre-paid processing, credit processing and point processing can be executed using a single card without, however, teaching any concrete means from the standpoint of automation and saving labor.

DISCLOSURE OF THE INVENTION

The present invention was accomplished and its object is to provide a card processor capable of easily and quickly executing business processing by establishing an automated system that continuously executes related functions and copes with a plurality of functions in order to improve service and business efficiency by the use of a card processor which exhibits a plurality of functions.

FIG. 1 is a schematic diagram illustrating a card processor according to the present invention.

A first invention is concerned with a card processor having a pre-paid processing function and a point processing function, comprising an identification means 7 for identifying the function possessed by a card depending upon the kind of the card, a judging means 8 for judging a function that can be processed in an interlocked manner depending upon the result of identification by said identification means 7, and an operation means 1 for executing the arithmetic operation processing based upon the result of judgement by said identification means 7 and/or said judging means 8, wherein the point processing is executed following the pre-paid processing in an interlocked manner.

A second invention is concerned with a card processor, wherein said function that can be processed in an interlocked manner is a point-issuing function, said identification means 7 identifies whether the card that is read is a pre-paid-only card, a pre-paid card or a point card which are separate from each other, or a card combining the pre-paid card and the point card, and, when the card is a combination card, said operation means 1 executes the point-issuing processing following the exact-calculation processing without discharging the card.

A third invention is concerned with a card processor, wherein said function that can be processed in an interlocked manner is a point-realizing processing, said judging means 8 judges whether the accumulated number of points of a customer has reached a predetermined number of points or not and when it has reached the predetermined number of points, said operation means 1 executes the realizing process to write into said pre-paid card the sum that corresponds to said predetermined number of points.

A fourth invention is concerned with a card processor having a bank POS function and a point processing function, comprising an identification means 7 for identifying the function possessed by a card depending upon the kind of the card, a judging means 8 for judging a function that can be processed in an interlocked manner depending upon the result of identification by said identification means 7, and an operation means 1 for executing the arithmetic operation processing based upon the result of judgement by said identification means 7 and/or said judging means 8, wherein the point processing is executed following the bank POS processing in an interlocked manner.

A fifth invention is concerned with a card processor which complies with the fourth invention, wherein said function that can be processed in an interlocked manner is a point-issuing function, said identification means 7 identifies whether the card that is read is a cash-only card, a cash card or a point card which are separate from each other, or a card combining the cash card and the point card, and, when the card is a combination card, said operation means 1 executes the point-issuing processing following the exact-calculation processing without discharging the card.

A sixth invention is concerned with a card processor which complies with the fourth invention, wherein said function that can be processed in an interlocked manner is a point-realizing processing, said judging means 8 judges whether the accumulated number of points of a customer has reached a predetermined number of points, and when it has reached the predetermined number of points, said operation means 1 executes the realizing processing in order to write the sum corresponding to said predetermined number of points into said point card.

A seventh invention is concerned with a card processor which complies with the fourth invention, wherein said function that can be processed in an interlocked manner is a point-transferring process, and when it is judged by said judging means 8 that the accumulated points have reached a predetermined number of points, said operation means executes the realizing processing of the sum corresponding to said predetermined number of points, and a communication means 9 executes the transfer processing to transfer the realized sum to the customer's account.

An eighth invention is concerned with a card processor in compliance with the second or fifth invention, wherein in issuing the points in the point service, the point-issuing rate can be arbitrarily set for each of the goods.

A ninth invention is concerned with a card processor in compliance with the third or sixth invention, wherein the data updated at the time of issuing the points of during the point-realizing processing, are also recorded in a host unit that manages the data.

A tenth invention is concerned with a card processor having a pre-paid processing function, a point processing function and a bank POS function, comprising an identification means 7 for identifying the function possessed by a card depending upon the kind of the card, a judging means 8 for judging a function that can be processed in an interlocked manner depending upon the result of identification by said identification means 7, and an operation means 1 for executing the arithmetic operation processing based upon the result of judgement by said identification means 7 and/or said judging means 8, wherein the point processing by the point card is executed in an interlocked manner following the transactions using a pre-paid card or a cash card.

An eleventh invention is concerned with a card processor in compliance with the tenth invention, wherein said card processor judges whether the accumulated number of points of a customer's point card has reached a predetermined number of points or not, and when it has reached the predetermined number of points, the operation means 1 calculates the sum that corresponds to the predetermined number of points and writes the sum corresponding to the number of points into the pre-paid card or transfers it to the customer's account.

A twelfth invention is concerned with a card processor in compliance with the tenth invention, wherein when the function used for the transactions is a pre-paid function, the sum corresponding to said number of points is written into the pre-paid card by the realizing processing executed by the operation means 1, and when the function used for the transactions is a bank POS function, the sum corresponding to said number of points is transferred to the customer's account by the realizing processing executed by the operation means 1.

Point service has become an accompaniment to transactions using cards in recent years, and the burden for the operator can be greatly reduced if the previous data of the transaction can be input automatically and continuously in the point service.

Moreover, if the result of point service could be automatically recorded in the customer's account such as the card, host computer, bank, etc., there is no need to issue a receipt or a slip to the customer. Therefore, trouble with the customer can be avoided, and the burden of cumbersome business processing stemming from the issuance of full-point receipts can be decreased.

The present invention is to continuously process such related business in a consistent system in order to simplify the business processing and to enhance efficiency.

From such a point of view, the card processor of the present invention performs a service for issuing points depending upon the functions of the card by taking over the data of exact-calculation processing after the exact calculation is finished in a transaction using a card.

That is, when the card is inserted in the card processor, the data of the card are read out by the reading means 2 with the card being taken in the reading/writing unit 11, the function possessed by the card is identified by the identification means 7, required data are stored depending upon this function, the operation means 1 executes processing in accordance with the purchase by the customer, required data such as the sum of purchase are stored in a storage, and the exact-calculation processing is finished.

Then, in the case of a card for which the processing can be executed in an interlocked manner, a point service program is started. When the pre-paid card and the point card are different from each other based upon the result identified by the identification means 7, the pre-paid card is discharged and the point card is inserted.

Then, the reading means 2 reads out the accumulated points on the magnetic stripe of the card, the operation means 1 finds the points corresponding the sum of sales at this time, adds the points to the accumulated points, and the writing means 3 writes newly accumulated points into the points region of the card. The card is then discharged.

According to the present invention as described above, a process is added to judge whether or not the process can be executed while being interlocked to the point processing using the card that is read in the pre-paid processing, in order to automatically distinguish the interlocked process and single process from each other depending upon the functions possessed by the card.

Moreover, a process is added to judge whether or not a point region exists on the card that is read out. When the interlocked processings can be executed using the same card, such processings are executed without discharging the card. Therefore, the card need not be read twice.

Unlike the prior art, therefore, double labor such as inserting the card again for processing the points, reading the card again, and inputting the sum of purchase again can be precluded; i.e., the operation is simplified, the processing is done quickly, and human error can be decreased. Besides, either the interlocked processing or the single processing can be carried out depending upon the function possessed by the card.

Moreover, the present invention executes the realizing process for the points. That is, when the service for issuing the points is finished, the judging means 8 examines whether the accumulated number of points has reached a predetermined number of points or not. When the predetermined number of points has been reached, this state is automatically judged, the predetermined number of points is converted into the sum which is then added to the pre-paid region of the card.

Therefore, the recovery processing at the time of "FULL POINT" can be automatically carried out to enable the recovering operation to be simplified. Moreover, there is no need to print slips or receipts, and undesired confusion or trouble can be avoided, enabling the processing to the executed within short periods of time and the business to be simplified and efficiently carried out.

Next, in the transaction by the bank POS system, provision is made of the communication means 9 which can make access to the customer's account and can effect transfer and withdrawal. Besides, the normal transaction and the point service are executed being interlocked to each other and, when the accumulated number of points reaches the predetermined number of points during the normal transaction, the sum corresponding to the number of points is automatically transferred to the customer's account.

Therefore, the operation of bank POS is automated and is simplified, enabling the processing to be executed within reduced periods of time and the operability to be improved.

BRIEF EXPLANATION OF DRAWINGS

FIG. 5 is a diagram illustrating a table of pre-paid companies that correspond to pre-paid cards of the present invention.

FIG. 6 is a diagram illustrating a table of banks that correspond to cash cards of the present invention.

FIG. 7 is a diagram illustrating the card data of the present invention.

BEST MODE FOR CARRYING OUT THE INVENTION

Embodiments of the present invention will now be described with reference to the drawings.

Figure 1:
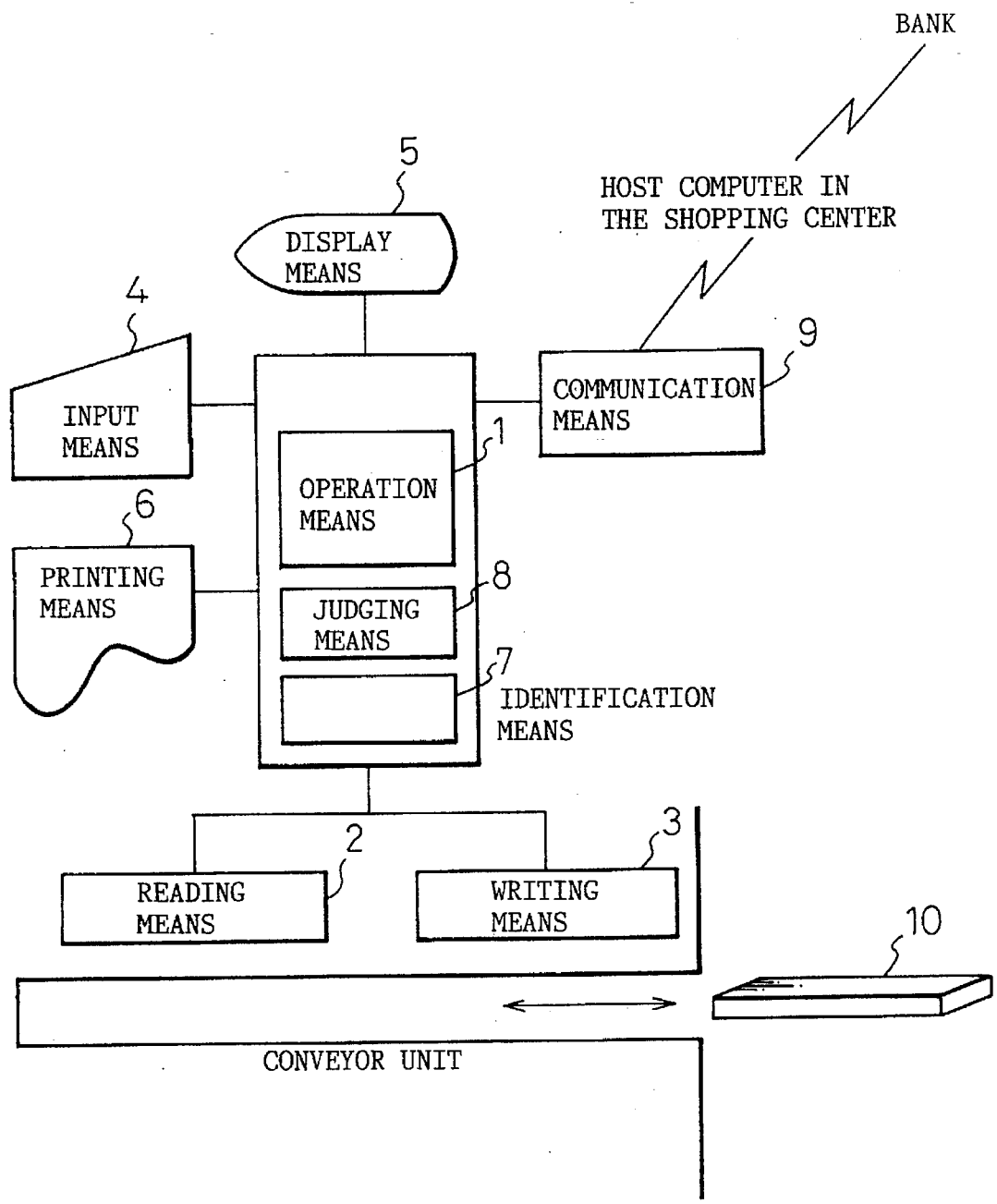
FIG. 1 is a diagram illustrating the principle of the present invention.
Figure 2:
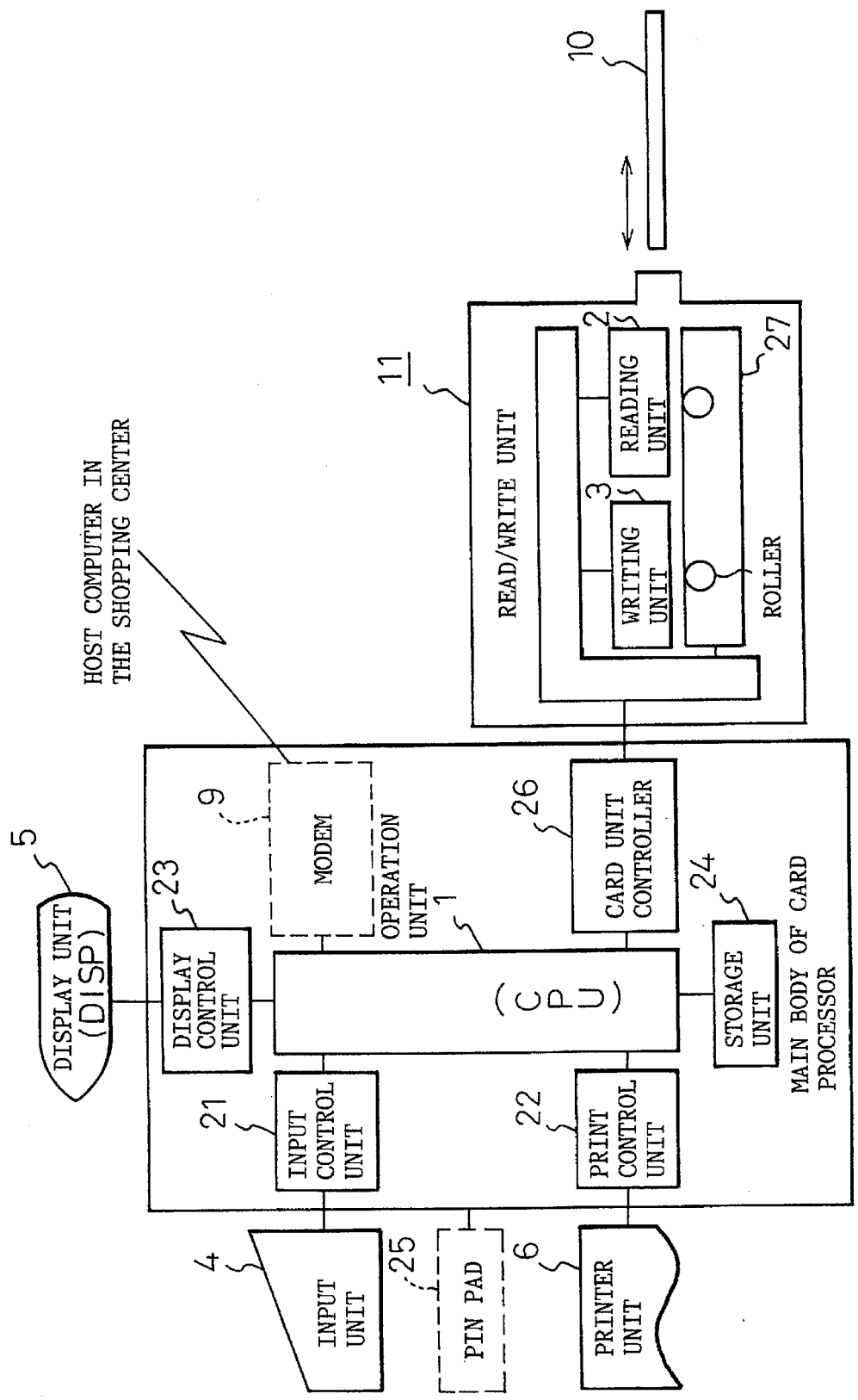
FIG. 2 is a diagram illustrating the constitution of a card processor of the present invention.
Figure 3:
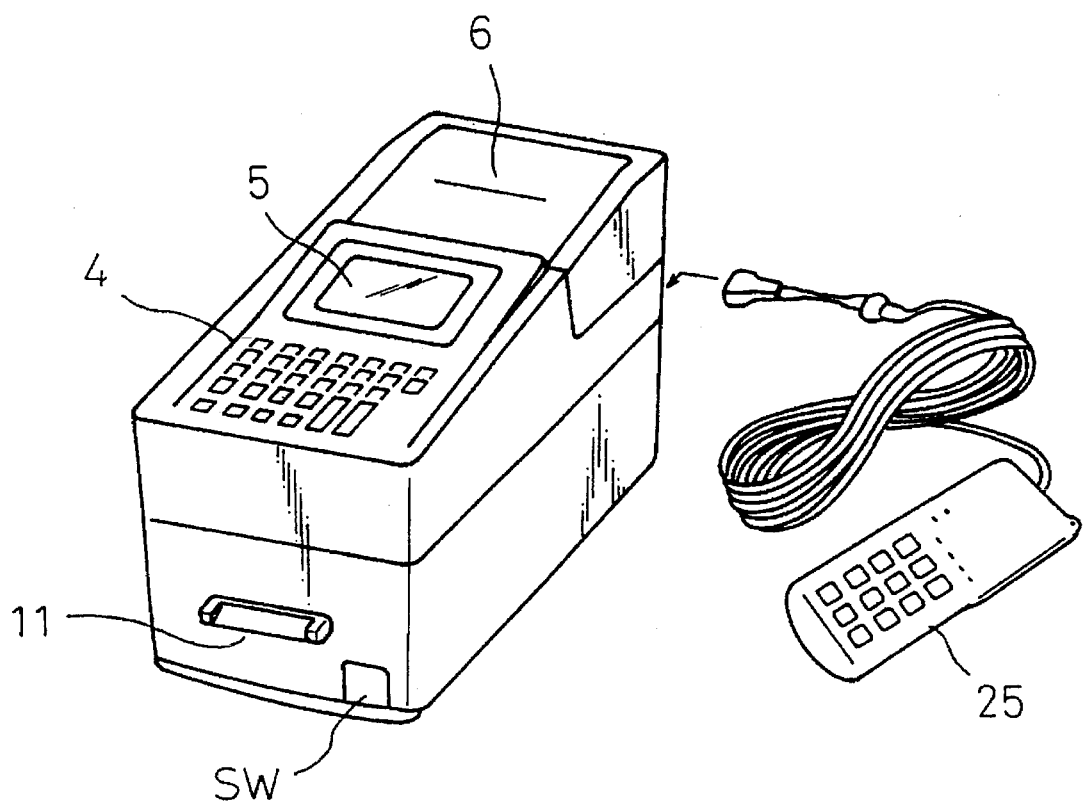
FIG. 3 is a diagram showing an example of the appearance of the card processor and a pin pad of the present invention.

FIG. 2 is a block diagram illustrating the whole constitution of the card processor according to an embodiment of the present invention, and FIG. 3 is a diagram illustrating the appearance of the card processor. Here, the portions which are the same as, or corresponding to those of the diagram of principle of FIG. 1 are denoted by the same reference numerals.

Referring to FIG. 2, the card processor comprises an operation unit 1, an input control unit 21, a print control unit 22, a display control unit 23, a modem 9, a card unit control unit 26 and a storage 24 and the card processor is connected to an input unit 4, a display unit 5, a printer unit 6, a pin pad 25, and a card read/write unit 11.

Reference numeral 1 denotes the operation unit which executes the arithmetic operation processing related to sales processing and point processing, and further controls the whole card processor.

The operation unit 1 finds the sum of sales input through the input unit 4, reads the balance data and accumulated points in the card 10 presented by the customer through the read/write unit 11, collates the points, as required, with the contents of the host unit, and executes exact-calculation processing and point service.

The input unit 4 works to input required data as manipulated by an operator, and may be a keyboard, a bar code reader, or the like. The input unit 4 inputs required data and conditions related to the processing function, and requirements related to a plurality of function processings.

The input control unit 21 controls the inputs from the keyboard so that predetermined functions are executed, and controls the transmission and reception of data to, and from, the operation unit 1.

The pin pad 25 (see FIG. 3) is a known one for inputting a personal identification number of a customer in the bank POS system or the like system.

The printer unit 6 prints required data such as names of goods, unit prices, quantities, subtotal of sales amounts, total, tax amounts, accumulated points, etc. on a receipt or on a small card, so that it can be issued to the user. The contents processed in an interlocked manner relying upon the printed contents can be visually displayed for confirmation.

The print control unit 22 controls the transmission and reception of signals between the operation unit 1 and the printer unit 6, and controls the printing operation of the printer that issues receipts.

The display unit 5 may be a CRT or a liquid crystal display. In operating the card processor, the display unit 5 displays a variety of input data such as names of articles, quantities, unit prices, total sum, etc., and further displays the state of the card processor, selection of required operation, next step, etc., which are messages to the operator.

The contents to be displayed include those related to the functions that are to be processed in an interlocked manner, those which indicate that the functions are going to be executed in an interlocked manner, errors, etc. in addition to those related to the processing functions.

The display control unit 23 controls signals between the display unit 5 and the operation unit 1, and displays data related to other functions provided they are included in the contents that have been set in advance in addition to processing the above-mentioned functions, and further controls the display for processing other functions in an interlocked manner after the above-mentioned functions are executed.

The modem 9 writes and reads data to, and from, the host unit and further effects collation (including a credit inquiry). Communications relative to a host computer in the shopping center are carried out through the modem 9.

The storage unit 24 is constituted by a ROM storing programs for operating the processor and a RAM for temporarily storing a variety of preset data from the host unit as well as data related to sales and printing. The program stored in the ROM is loaded to the RAM, and the operation unit 1 operates in accordance with the program stored in the RAM to control the whole card processor.

The storage unit 24 is used for storing sales data and data stored in the card 10, and for temporarily storing printing data that are to be printed onto the receipt or the card 10.

The RAM stores data related to the processing function, flags for continuously executing the accumulated point processing, procedures necessary for executing other functions, as well as data needed for these processings.

The read/write unit 11 reads and writes data to, and from, the magnetic stripe at a predetermined position of the card 10 while permitting the card 10 to pass through. The magnetic stripe data that are read out are transferred to the card processor, and are processed according to a predetermined program.

For this purpose, the read/write unit 11 is constituted by a card inserting/discharging unit 27, a reading unit 2 and a writing unit 3, and is connected to the operation unit 1 in the card processor through the card unit controller 26.

The reading unit 2 is used to read particular data of a user held in the card 10 to identify the user and to read data related to transactions. Such particular data and data of transactions of the user are temporarily stored in the RAM, read out, as required, from the operation unit 1, and are used for processing the transactions.

The writing unit 3 is also used for recording the result of exact-calculation of transactions and points processed by the operation unit 1 in the magnetic stripe provided in the card 10. Though magnetic processing is usually employed, the card may be a magneto-optic one utilized laser. Visual means such as perforations or printing may be used in combination to let the user know the limit of use.

Concretely speaking, the sum of sales is subtracted from the balance stored in the magnetic portion of the card 10 to execute the exact-calculation processing. The sum remaining after the subtraction is written again by the writing unit 3 into the card 10.

The card inserting/discharging unit 27 is the known one which inputs and outputs a predetermined card 10 in response to a control signal from the operation unit 1 in order to execute exact-calculation and point processing of transactions.

The card unit controller 26 controls the reading unit 2, writing unit 3 and card inserting/discharging unit 27 so that they exhibit their predetermined functions, and further controls the transmission and reception of data relative to the operation unit 1.

The card 10 in this embodiment is a magnetic card having a magnetic stripe in which can be stored ID of a customer, face value, data related to balance, date, accumulated points, number of the company that has issued the card and various data related to the customer.

The present invention uses a magnetic card as the card 10 which, however, needs not be limited thereto only but may be any recording medium of the portable type into which, or from which, the data can be written and read out, such as an IC card or the like.

Figure 4:
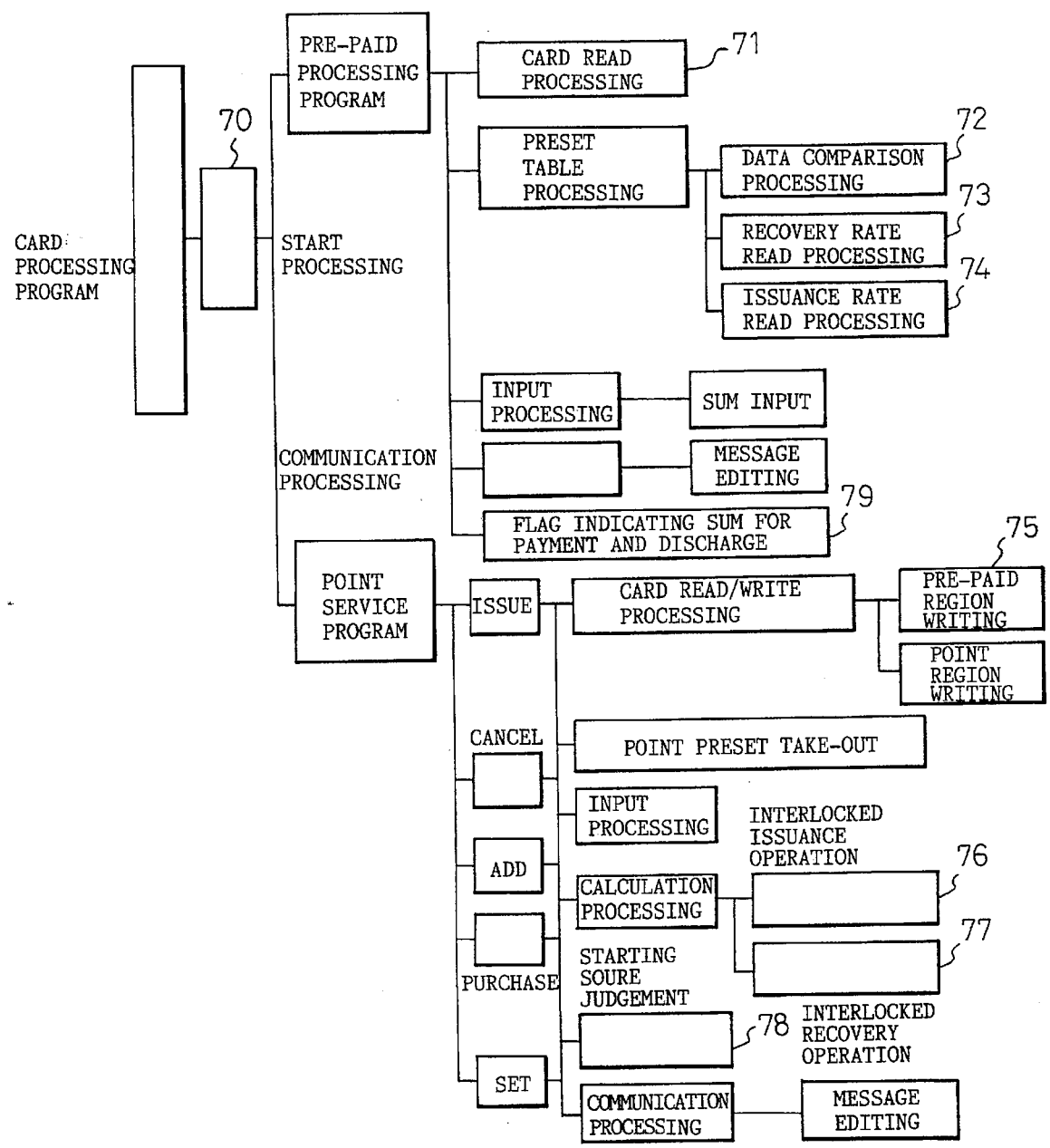
FIG. 4 is a diagram illustrating a software constitution of the present invention.

FIG. 4 is a diagram illustrating the software constitution according to the present invention. As shown, a pre-paid processing program of the present invention is provided with a "card read processing" 71 for judging whether there is a point region on the card 10 that is read out in order to determine whether the card 10 be discharged or be kept inserted depending upon whether the card 10 being inserted at the time of interlocked processing is an integrated POS card or not.

A preset table processing is provided with a "data comparison processing" 72 for comparison with the code of the company that has issued the preset file card in order to determine whether or not the interlocked processing can be carried out using the card 10 that is read out, is provided with an "issuance rate read processing" 74 for reading the point issuance rate for each of the companies, and is provided with a "recovery rate read processing" 73 for reading the reference of realization when the full point is reached.

According to the present invention, the table for a pre-paid company (see FIG. 5) is provided for each of the companies. By setting the point issuance rate for each of the companies, therefore, point services can be easily discriminated for each of the companies that have issued the cards.

On the other hand, a point service program is provided, as operation processings, with an "interlocked issuance operation" 76 for operating the number of points issued depending upon the sum of transactions and with an "interlocked recovery operation" 77 for finding the realizing amount from a predetermined number of points when the full point is reached.

There are further provided a "pre-paid region writing process" 75 for adding the realized sum at the time of full point and writing it into the pre-paid region, and a "starting source judgement process" 78 for judging whether the source of starting the point service is a pre-paid card or a cash card.

There are further provided a "start process" 70 for starting the point processing when the interlocked processing can be carried out, and a "flag of sum for payment/discharge process" 79 which follows the point processing using, as data, a value input from the input unit 4 of the card processor as the sum of payment in the pre-paid transaction at a moment when the point processing is started and a judgment flag which indicates whether the card 10 has been discharged or not.

FIG. 5 is a diagram illustrating the constitution of a table of pre-paid companies of when a plurality of functions for issuing points are to be continuously processed following the pre-paid card processing.

A company code is a code number of a company which has issued the card, printed data specific to company are related to the name of a company that has issued the card, and group number is the one imparted to the cards of the same series.

In order to execute the interlocked processing according to the present invention, the preset region is provided with an interlocking yes/no flag, an interlocked issuance rate and an interlocked recovery rate as shown.

In the point processing for each of the pre-paid companies, the interlocking yes/no flag may be, for example, 0 indicating that a single processing is being executed, may be 1 indicating that the pre-paid card and the point card are different from each other, and may be 2 indicating that the card is an integrated POS card (by using this card the payment can be executed by credit, bank POS, and pre-paid fashions and service can be obtained for point service). By reading the interlocking yes/no flag, the operation unit 1 renders the decision to display a required message on the display unit 5 and to execute the arithmetic operation.

By setting required data in the preset file in advance, furthermore, it is possible to discriminate services depending upon the kinds of cards, methods of transactions, kinds of the purchased goods, etc. For instance, a pre-paid card, a credit card and a cash card can be handled by the above-mentioned method.

FIG. 6 illustrates a table of banks of when points are issued following cash card processing. A company code is a code number of a company that has issued the card, printed data specific to the company are related to the name of a company that has issued the card, and group number is the one imparted to the cards of the same series.

As in FIG. 5, an interlocking yes/no flag is provided for setting a flag of whether a plurality of functions be processed in an interlocked manner or not, in addition to the company code, printed data specific to the company and payment method selection data. Depending upon the state of the flag, it is determined whether the processings are to be executed in an interlocked manner or if a single processing is to be executed.

The table of banks is stored in the host unit and is transferred to a terminal equipment upon collation processing.

Whether the card 10 inserted in the case of interlocked processings is an integrated POS card or not, is judged relying upon the presence of the point region on the inserted card 10 that is read by the reading unit 2.

FIG. 7 illustrates data of a cash card which is provided with an interlocking yes/no flag for setting a flag of whether a plurality of functions be processed in an interlocked manner or not, in addition to member number, personal identification number, valid term, etc., in order to determine whether or not the processings can be executed in an interlocked manner or as a single processing depending upon the state of the flag.

Figure 8:
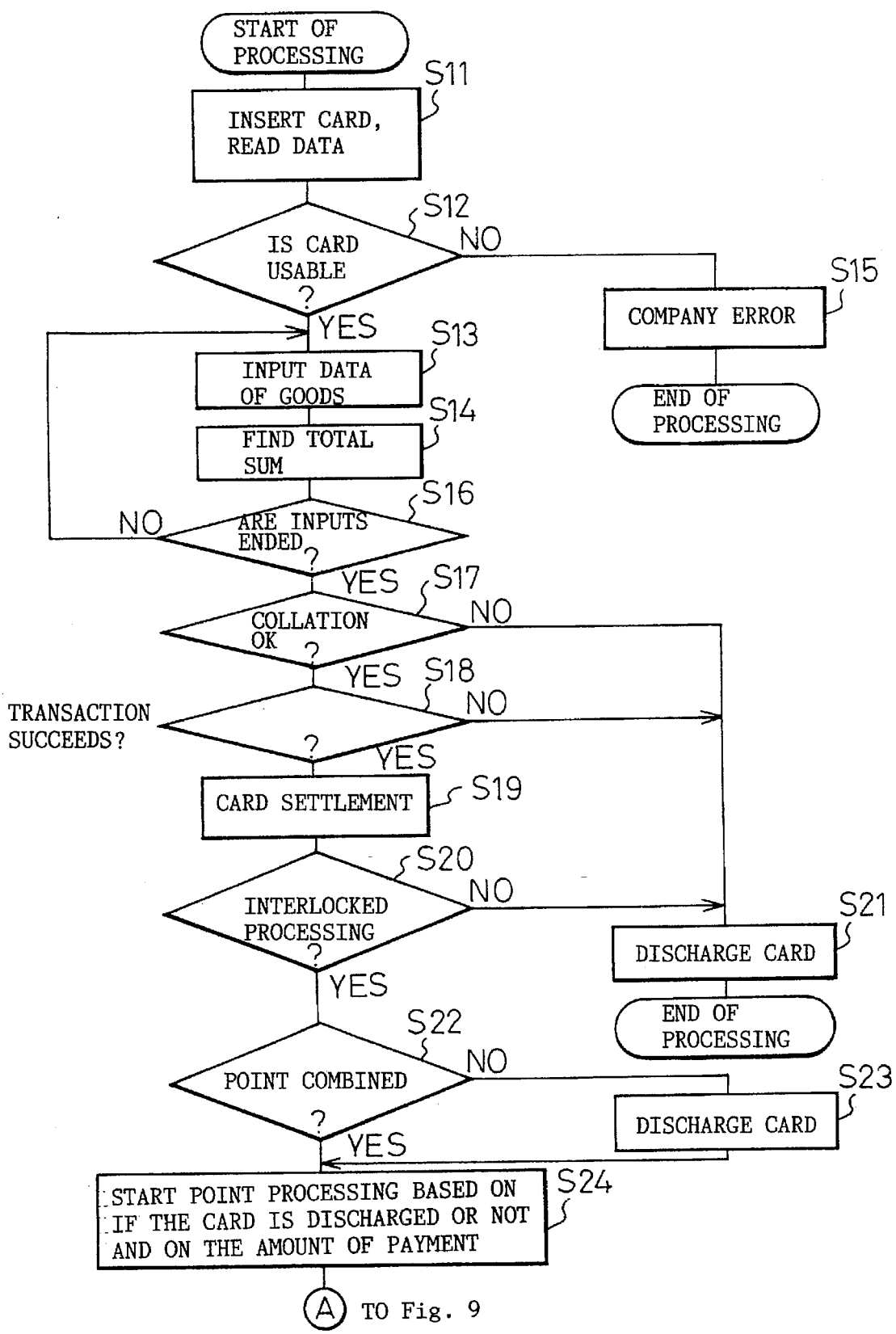
FIG. 8 is a flow chart illustrating the operation according to a first embodiment of the present invention.
Figure 9:
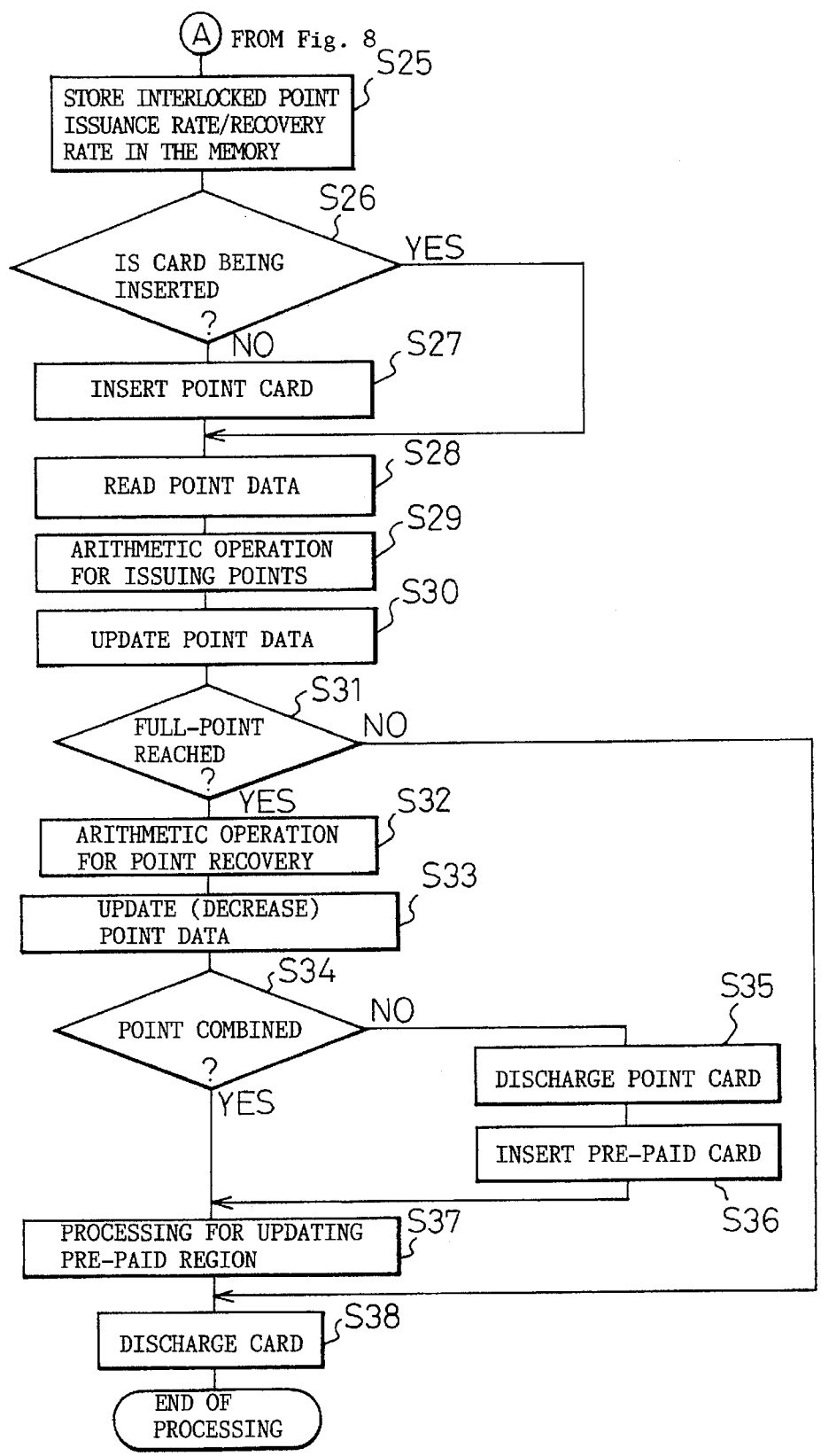
FIG. 9 is a flow chart (continued) illustrating the operation according to the first embodiment of the present invention.

FIGS. 8 and 9 are a flow chart illustrating the operation of the card processor equipped with functions for executing the exact-calculation processing and point issuance processing in an interlocked manner according to a first embodiment. The operation of the interlocked processings will now be described with reference to FIGS. 8 and 9.

When the transaction is started, the card 10 is first inserted in the read/write unit 11, whereby the required data are read out by the reading unit 2 (step S11) and are stored in the RAM in the storage unit 24.

The data that are read out are related to, for example, user's ID, balance in the case of a pre-paid card, available limit in the cash service, valid term, code for discriminating the kind of system that can be used, etc.

Then it is determined whether the card 10 that is inserted can be used or not (step S12). That is, the company code of company that is stored in the pre-paid card stored in the card 10 is compared with the card processor or with the company code stored in a table of companies that have issued pre-paid cards (see FIG. 5) stored in the host unit.

In this comparison, when the data of company code are not in agreement, the card is not usable in the store. Therefore, this fact is displayed on the display unit 5, the card 10 is discharged, and the processing concerned with the customer is discontinued (step S15).

On the other hand, a company code coinciding with code of the issuing company stored in a card is stored in the table of company issuing the pre-paid card. When it is confirmed that the card 10 is usable, the operator is informed of the fact and inputs through the input unit 4, the kinds of goods purchased by the customer, codes, unit prices, quantities, etc. (step S13) to carry out the exact-calculation in the transaction. The transaction data that are input are sequentially registered in the RAM in the storage unit 24 and, then, the operation unit 1 finds the total sum of sales amounts (step S14).

These data can be input not only by using a keyboard but also by using in combination an automatic reader such as a bar code reader that reads bar codes attached to goods or shown in a list.

It is then checked whether the input of data is ended (step S16). The end of input is executed by pressing an end key.

When the input of goods purchased is not still ended at the step S16, the program returns back to the step S13 where the input of purchased goods is continued.

When the input of transaction data is ended, the collation processing is then executed (step S17). That is, in the case of a pre-paid card, inquiry is made, as required, to the system managed by the host unit to confirm the customer's ID, valid term of the card, etc. and in the case of a cash card, credit is checked to the host unit and the validity of the card 10 is judged based upon the result of collation.

When the accumulated points of the customer reaches a predetermined number of points, this fact is notified as a message from the host unit to a terminal.

When the card 10 is not usable by reason expiry or the like as a result of collation, a predetermined display is made on the display unit 5 and the card 10 is discharged (step S21) to end the processing.

When the card 10 that is inserted is usable as a result of collation at the step S17, on the other hand, it is then checked whether the transaction was successful or not (step S18).

That is, collation including a credit inquiry is executed in the case of the cash card or a balance is read out from the storage unit 24 in the case of the pre-paid card to make sure whether the balance is sufficient.

When the transaction does not succeed by reason insufficient funds or the like the fact that the transaction does not succeed and the reason are displayed on the display unit 5 to let the operator know, and the cord 10 is discharged to end the processing (step S21).

When the transaction was successful, the card account is settled (step S19). That is, the writing unit 2 reads out the data from the storage unit 24, and writes required data such as the codes of goods purchased, unit prices, etc. together with the date, time and the amount purchased onto the card 10, updates (reduces) the sum of the card 10, and ends the settlement.

Then, it is checked whether interlocked processings (the point processing and exact-account processing) can be carried out (step S20). The method of Judgement can be divided into a method in which, by using the preset table, an interlocking yes/no flag (0: no; 1: yes) for each of the companies in the tables of pre-paid companies (see FIG. 5) is observed and the possibility of the interlocking processings is judged, and a method in which the interlocking flag in the card 10 is observed and the interlocking processes are judged as possible.

When the interlocking is not available, then the pre-paid processing only is executed in a customary manner, and the card 10 is discharged (step S21) to end the processing.

In the case of the interlocked processings, on the other hand, it is checked whether the card 10 is the one in combination with a point card (step S22). This judgement is based upon whether a point region exists on the same card or not.

In the case of the integrated POS card, i.e., when the pre-paid processing and the point processing can be executed using the same card, the card 10 is not discharged and the processing proceeds to a next step. When there is no point region on the card 10, on the other hand, the card 10 being inserted is discharged (step S23) and the processing proceeds to a next step.

At starting the point processing, whether the card 10 is discharged or not, the amount of payment is handed over to start the point processing program (step S24), and the point issuance rate and recovery rate in the preset file are read out and are stored in the RAM in the storage unit 24 (step S25).

It is then checked whether the card 10 is inserted or not (step S26). When the card 10 has been inserted, the point data are read out (step S28).

When the card 10 has been discharged, on the other hand, the point card is inserted (step S27) and the point data are read out (step S28).

Next, arithmetic operation processing is executed to issue the points (step S28). That is, to calculate the issuance of points, the number of points issued is found from the data related to the sum of purchase handed over from the source of start (pre-paid processing or bank POS processing) and the point issuance rate (see FIG. 6) stored in the RAM (step S29), and the point data in the card 10 are updated (step S30). Sometimes, the updating of the point data is managed by the host computer.

The interlocked processings for issuing the points are thus ended. Then, it is checked whether the accumulated number of points has exceeded a predetermined value or not. When it has exceeded the predetermined value, "FULL-POINT SERVICE" processing is executed.

After the point data in the step 30 have been updated, it is checked whether the accumulated number of points has reached a predetermined service number of points (step S31). When the accumulated number of points has not been reaching the predetermined number of points, "FULL-POINT SERVICE" does not succeed. Therefore, the card 10 is discharged (step S38) to end the processing.

When the accumulated number of points reaches the service number of points at the step S31, the point recovery rate stored in the RAM is multiplied by a reference sum to find the sum of realization (step S32).

Then, the number of points corresponding the sum of realization is subtracted from the accumulated number of points, and the point data in the host unit are updated as required (step S33).

Next, it is checked whether the card 10 inserted is an integrated POS card or not (namely, whether the pre-paid/credit service and the point processing are used together or not) (step S34). When it is an integrated POS card, the processing is executed to update the pre-paid region of the card 10 (step S37).

That is, the realized sum found at the step S32 is added to the balance in the pre-paid card or is deposited to the bank account of the customer. The card 10 is then discharged (step S38) to end the processing.

When it is not an integrated POS card, on the other hand, the point card 10 is discharged (step S35), the pre-paid card is inserted (step S36), processing is executed for updating the pre-paid region of the card 10 (step S37), and the card 10 is discharged (step S38) to end the processing.

Though this embodiment has dealt with the case of the pre-paid card, the same processing can be executed even in the cases of a credit card and a cash card. Moreover, the processor of the invention permits the use of a conventional card of the type of single processing, a pre-paid card and a point card which are separate from each other, and an integrated POS card.

According to the present invention as described above, the processing for issuing service points and the "FULL-POINT" processing are automatically executed following the exact-calculation processing, making it possible to decrease the waste of time stemming from the discharge of card, re-insertion of card and re-input of data by the operator. This helps reduce congestion at a cash register when the shop is crowded and, hence, helps enhance the service.

The present contents may be displayed and may be printed as well.

Figure 10:
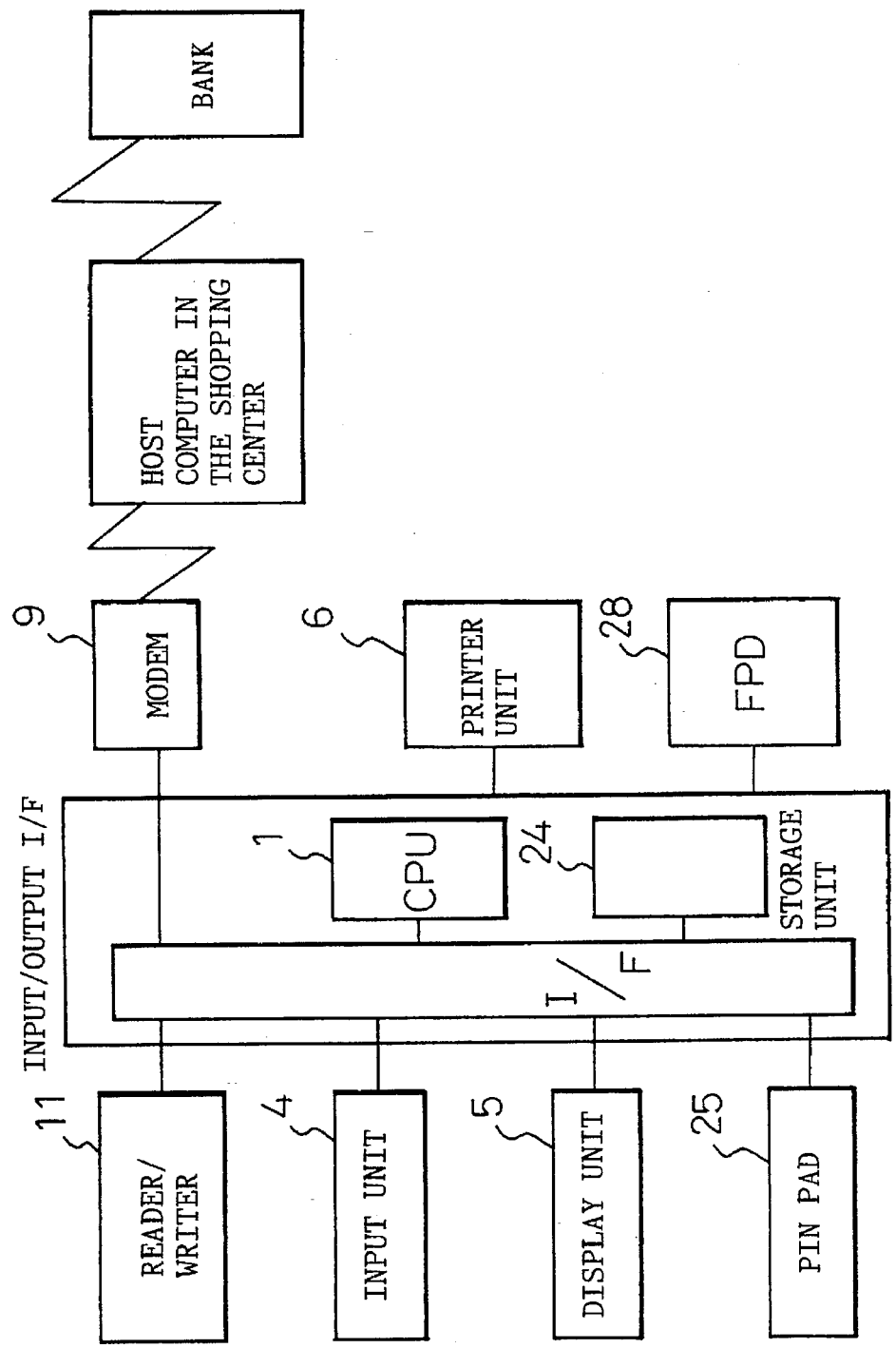
FIG. 10 is a diagram illustrating the constitution of a bank POS system.

FIG. 10 is a diagram illustrating the constitution of a bank POS system having functions capable of automatically executing the point service according to a second embodiment.

The processor is basically constituted relying upon the constitution of the card processor of the first embodiment, and is equipped with a pin pad 25 for collating personal identification numbers and with a modem 9, which is a communication means, and works to automatically effect the transfer to the customer's bank account and to effect the withdrawal through a host computer in the shopping center.

The card processor of the invention has a reading unit 2 and a writing unit 3 capable of reading and writing data from, and into, a cash card, a point card, as well as an integrated POS card which can be used either as a cash card or a point card.

An identification unit 7 in the operation unit 1 identifies whether the card 10 read by the reading unit 2 is a cash card or an integrated POS card with which the point transaction can be executed. The identification is based upon whether a point region exists in the card 10 or not.

When the result of identification indicates that it is a cash card, a bank code is read out from the card 10, and an "INTERLOCKING WITH POINT TRANSACTION YES/NO" data (flag) (see FIG. 6) that has been set for a bank code of a corresponding bank are read out from a present item of the card processor. When the data indicate "INTERLOCKING YES", the sum is taken over after the transaction by bank POS is finished, and the program proceeds to the point processing.

Thus, the amount of purchase produced through transaction by the bank POS is drawn out from the customer's account and the realization of "FULL-POINT RECEIPT" is transferred to the customer's account all through the host computer in the shopping center. Therefore, the terminal card processor need simply maintain communication with the host computer in the shopping center, and their basic constitutions are little different from those of the prior art.

Figure 11:
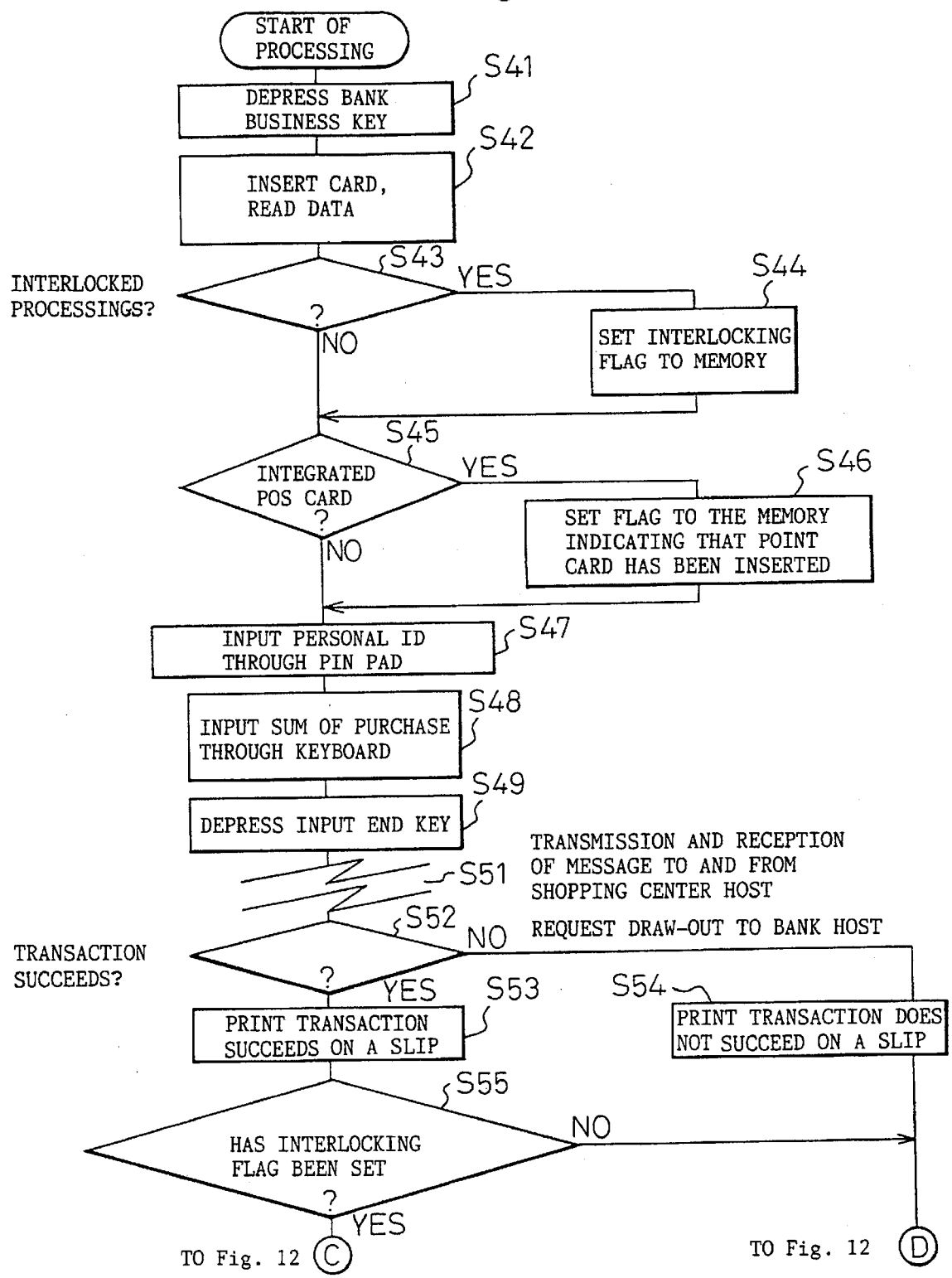
FIG. 11 is a flow chart illustrating the operation of the bank POS system according to a second embodiment of the present invention.
Figure 12:
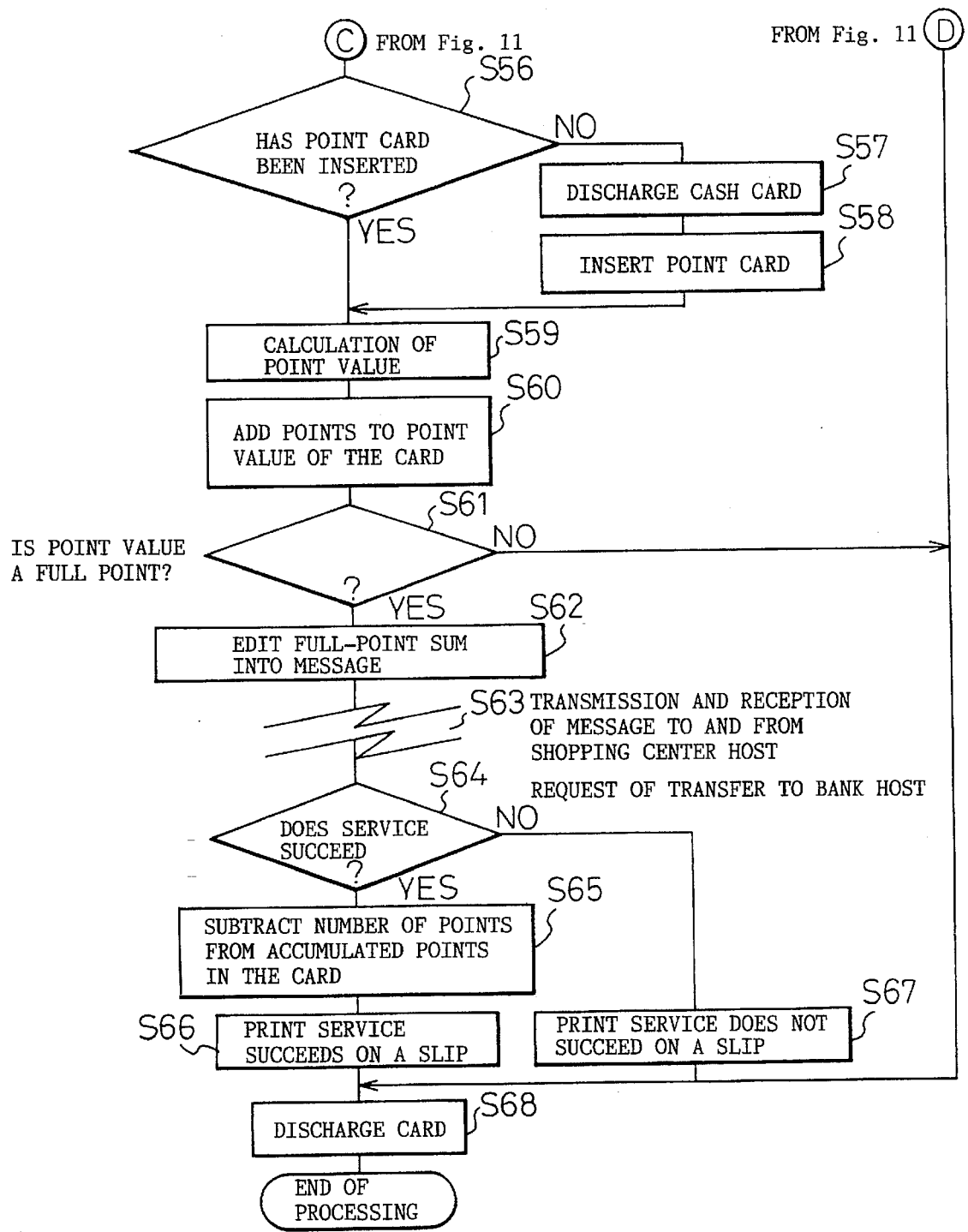
FIG. 12 is a flow chart (continued) illustrating the operation of the bank POS system according to the second embodiment of the present invention.

FIGS. 11 and 12 is a flow chart illustrating the operation of the card processor by the bank POS according to a second embodiment. The operation of the bank POS system will now be described with reference to FIGS. 11 and 12.

To start the transaction, the operator selects and depresses "BANK POS BUSINESS" on the keyboard (step S41). The bank POS function is thus started.

Next, the customer's cash card is inserted in the read/write unit 11, and required data are read out by the reading unit 2 (step S42) and are stored in the RAM in the storage unit 24.

The data that are read out may include, for example, user's ID, bank number, available limit in cash service, valid term, codes (the codes are used as the card data of JIS #8 in the integrated POS card, and a code (1): prepaid business; a code (2): point business; a code (3): pre-paid and point businesses together, etc.; and thus, the codes are determined to be somewhat usable in a pre-paid business or a stamp business) indicating the type of the system that can be used, etc. The reading unit reads not only those data necessary for the processing functions among the above data but also the data related to other present functions.

It is then checked whether the object bank of the inserted card 10 permits the point processing to be executed in an interlocked manner (step S43). This is done by retrieving an interlocking yes/no flag of the bank from a bank table stored in the storage unit 24 of the card processor.

In this retrieval, when the card 10 that is inserted is the one that permits the point service processing to be executed in an interlocked manner, a flag is set in the RAM of the card processor indicating that "INTERLOCKED PROCESSING POSSIBLE" (step S44).

When the interlocked processing is not possible, the program proceeds to a step S45.

It is then checked whether the card 10 being inserted is an integrated POS card or not (step S45). This is done for the purpose that when the point business is executed in an interlocked manner, then the card need not be read out again provided that the card being used is an integrated POS card.

When the card 10 that is inserted is an integrated POS card, a flag is set on the memory of the card processor indicating that "POINT CARD HAS BEEN INSERTED" (step S46).

When it is not the integrated POS card, on the other hand, the program proceeds to a next step with the flag being set OFF.

The operator then inputs a personal identification number through the pin pad (step S47) and, further, the sum of goods purchased by the customer is input through the keyboard 4 (step S48). The input transaction data are stored in the RAM in the storage unit 24.

When the input of the purchased sum is finished, the input end key on the keyboard is depressed (step S49).

When the input end key is depressed, the data input at the step S48 are edited into a message in the memory and are automatically transmitted, via the modem, to the destination telephone number set in the terminal to effect collation processing including credit inquiry (step S51) and to obtain approval for draw-out from the account.

Here, the destination is the host computer in the shopping center. The host computer in the shopping center that is called then passes the call to a host computer in the corresponding bank. There exist three methods for point management. In the first method, point data are not stored on a card and only a host computer manages the point data. In the second method, point data are stored on the card and card and a host computer manages point data (the card has a priority). In the third method, only card manages point data. When the data is managed by the card, information from the host unit is not necessary.

At this moment, when the points have reached a predetermined number of points, this fact is notified from the host computer in the shopping center.

It is then checked whether the transaction succeeds (step S52). That is, the card processor that has received a message stating "TRANSACTION SUCCEEDS" from the bank through the host computer in the shopping center, executes the processing to draw out the sum from a predetermined account, and the printer unit 6 prints this message on a slip. The transaction is thus ended and, then, the point processing is executed.

On the other hand, when the transaction does not hold at the step S52, i.e., when a message stating "TRANSACTION DOES NOT SUCCEED" is received from the host computer in the shopping center, a predetermined display is made, and the printing unit 6 prints this message on a slip (step S54), and the card 10 is discharged (step S68) and the processing ends.

In the point processing, it is first checked whether a flag for interlocked processing has been set (step S55). When the flag (for determining whether interlocking function to the stamp business is executed or not) for interlocked processing has not been set, the point processing is not executed and the card 10 is discharged (step S68) to end the processing.

When the flag for interlocked processing has been set, on the other hand, it is checked whether the point card has been inserted or not (step S56). This is judged relying upon the presence or absence of a flag set at the step S46.

When the point card has been inserted, the program proceeds to the next step. When the point card has not been inserted, however, the cash card 10 that is now inserted is discharged (step S57), the point card is inserted instead (step S58), and the program proceeds to a next step.

The point value is calculated (step S59) to find the number of issued points from the sum of purchase stored in the RAM and the point interlocking issuance rate (this means a rate of point value to the sum of purchase) on the preset file.

Next, the point value purchased this time is added to the point value that has been recorded in the card 10 (step S60). That is, the number of points found at the step S59 is added to the region of accumulated points of the card 10 in the read/write unit 11.

The processing for issuing points is thus ended and, then, the processing for "FULL POINT" is executed.

In the processing of "FULL POINT", it is first judged by a judging unit 9 in the operation unit 1 whether the accumulated number of points has reached a predetermined number of points or not (step S61). When it has not reached the predetermined number of points, the card 10 is discharged (step S68) and the point processing is discontinued.

When the accumulated number of points has reached the predetermined number of points, on the other hand, the sum corresponding to the number of points is found, edited into a message on the memory (step S62) and is automatically transmitted to the host computer in the shopping center via modem (step S62).

Upon receipt of the message from the card processor, the host computer in the shopping center makes a collation to the computer in the corresponding bank, and the sum corresponding to the number of service points is automatically transferred to the customer's bank account (step S63).

Then, it is confirmed whether the point service holds or not (step S64). That is, whether the point service holds or not is confirmed after the message from the bank is received by the host computer in the shopping center and after having transmitted a message to the card processor stating that the transfer is complete.

The card processor that has received a message stating transfer completed from the host computer in the shopping center. Subtracts the number of service points spent this time from the accumulated number of points in the point card 10 (step S65), and the printer unit 6 prints service succeeds on a slip (step S66) and the card 10 is then discharged (step S68).

The operator hands the discharged point card 10 and the receipt over to the customer to end the processing.

When the service does not succeed, on the other hand, the reason why the service does not succeed is displayed on the display unit 5, the printer unit 6 prints service does not succeed on a slip (step S67), and the card 10 is discharged (step S68) to end the processing.

According to the present invention as described above, both the bank POS transaction and the point processing can be executed by using a single card processor. Besides, the points are automatically issued following the bank POS transaction. When the points reach a predetermined number, the realized sum of the "FULL POINT" amount is transferred to the customer's account and points are automatically decreased in the point card, contributing greatly to improving operability of the bank POS system.

[Industrial Applicability]

According to the present invention as described above in detail, a single card processor capable of executing the pre-paid processing and the point processing, executes the pre-paid processing and the point-issuing processing in an interlocked manner depending upon the kind of the card.

Therefore, the operation is simplified yet making it possible to reduce congestion at a cash register when the shop is crowded, to reduce the time which the customers have to wait and to improve service.

When the accumulated number of points reaches a predetermined number of points, the sum of the predetermined number of points is automatically added to the pre-paid region on the card, whereby the work can be eliminated such as issuing a receipt of "FULL POINT" or merchandise coupon, and the customers will find it more convenient to use.

According to the second invention, furthermore, when the accumulated number of points reaches a predetermined value, a predetermined amount is automatically transferred to the customers account without causing trouble to the customer, contributing greatly to enhancing the convenience of the bank POS system.

Even on the side of the shops, the bank POS business and the stamping business are executed while being interlocked together enabling the operation to be simplified (number of times of touching the keys and number of times of inserting the cards are decreased). When the processes are not interlocked, the settings can be changed for each of the banks making it possible to flexibly cope with the needs of the customers.

We claim:

1. A card processor having functions for realizing transaction processing or exact-calculation processing and having a point service processing function, wherein point service is defined as service given to a customer corresponding to points issued depending upon a paid sum, said card processor comprising:

a card reading means for reading the contents of a card in said card processor;

an identification means for identifying at least one function possessed by a card and for identifying whether a card in said card processor is a single function card or a multiple function card;

a judging means for judging a function that can be processed in an interlocked manner and for judging whether a card has a single function or multiple functions depending upon the result of identification by said identification means; and an operation means for executing arithmetic operation processing based upon the result of judgement by said identification means and/or said judging means, for discharging the card upon completion of an interlocked process, if an interlocked process is judged to be possible, and for discharging the card prior to execution of an interlocked process, if an interlocked process is judged to be not possible;

wherein point processing is executed following transaction processing or exact-calculation processing in an interlocked manner when the interlocking processing is judged to be possible.

2. A card processor according to claim 1, wherein said transaction processing or said exact-calculation processing is a pre-paid processing whereby, cash is pre-paid prior to processing.

3. A card processor according to claim 2, wherein said function that can be processed in an interlocked manner is a point issuing function, said identification means identifies whether the card that is read is a combination card or not, and, when the card is a combination card, said operation means executes the point-issuing processing following the exact-calculation processing without discharging the card.

4. A card processor according to claim 2, wherein said function that can be processed in an interlocked manner is a point-realizing processing, said judging means judges whether the accumulated number of points of a customer has reached a predetermined number of points or not and when it has reached the predetermined number of points, said operation means executes the realizing processing to write into said pre-paid card the sum that corresponds to said predetermined number of points.

5. A card processor according to claim 3, wherein in issuing the points in said point service, the point-issuing rate can be arbitrarily set for each of the goods.

6. A card processor according to claim 4, wherein the data updated at the time of issuing the points or during the 7. A card processor according claim 1, wherein said transaction processing or said exact-calculation processing is a bank POS processing, whereby bank POS processing is the processing in which the price of goods that are purchased is transferred from a customer's bank account.

8. A card processor according to claim 7, wherein said function that can be processed in an interlocked manner is a point-issuing function, said identification means identifies whether the card that is read is a combination card or not, and, when the card is the combination card, said operation means executes the point-issuing processing following the exact-calculation processing without discharging the card.

9. A card processor according to claim 7, wherein said function that can be processed in an interlocked manner is a process for realizing points and transferring the realization to a customer's account and when it is judged by said judging means that the accumulated points have reached a predetermined number of points, said operation means executes the realizing processing of a sum corresponding to said predetermined number of points, and a communication means executes a processing for transferring the realized sum to the customer's account.

10. A card processor according to claim 7, wherein said function that can be processed in an interlocked manner is a point-realizing processing, said judging means judges whether the accumulated number of points of a customer has reached a predetermined number of points or not and when it has reached the predetermined number of points, said operation means executes the realizing processing to write into said point card the sum that corresponds to said predetermined number of points.

11. A card processor according to claim 8, wherein in issuing the points in said point service, the point-issuing rate can be arbitrarily set for each of the goods.

12. A card processor according to claim 9, wherein the data updated at the time of issuing the points or during the point-realizing processing, are also recorded in the host unit that manages the data.

13. A card processor having a pre-paid processing function, a point processing function and a bank POS function, comprising:

a card reading means for reading contents of a card in said card processor;

an identification means for identifying at least one function possessed by a card and for identifying whether a card in said card processor is a single function card or a multiple function card;

a judging means for judging a function that can be processed in an interlocked manner and for judging whether a card has a single function or multiple functions depending upon the result of identification by said identification means; and an operation means for executing the arithmetic operation processing based upon the result of the judging by said identification means and/or said judging means for discharging the card upon completion of an interlocked process, if an interlocked process is judged to be possible, and for discharging the card prior to execution of an interlocked process, if an interlocked process is judged to be not possible;

wherein the point processing for the point card is executed in an interlocked manner following the transaction for a pre-paid card or a cash card, when processing in an interlocked manner is judged to be possible.

14. A card processor according to claim 13, wherein said card processor judges whether the accumulated number of points in a customer's point card has reached a predetermined number of points or not, and when it has reached the predetermined number of points, said operation means calculates the sum that corresponds to said predetermined number of points and writes the sum corresponding to said number of points into the pre-paid card or transfers it to the customer's account.

15. A card processor according to claim 13, wherein when the function used for the transactions is a pre-paid function, the sum corresponding to said number of points is written into the pre-paid card by the realizing processing executed by the operation means, and when the function used for the transactions is a bank POS function, the sum corresponding to said number of points is transferred to the customer's account by the realizing processing executed by the operation means.

16. A card processor having multiple functions for realizing transaction processing or exact-calculation processing and having a point service processing function, wherein point service is defined as service given to a customer corresponding to points issued depending upon a paid sum processing function, said card processor comprising:

a card reading means for reading the contents of a card in said card processor;

a judging means for judging a function that can be processed in an interlocked manner and for judging whether a card has a single function or multiple functions; and an operation means for executing arithmetic operation processing based upon the result of judgement by said judging means;

wherein point processing is executed following transaction processing or exact-calculation processing in an interlocked manner when the interlocking processing is judged to be possible.

* * * * *